Oct. 17, 1961   J. W. HICKS, JR   3,004,368
MANUFACTURE OF FIBER OPTICAL DEVICES
Filed June 10, 1958
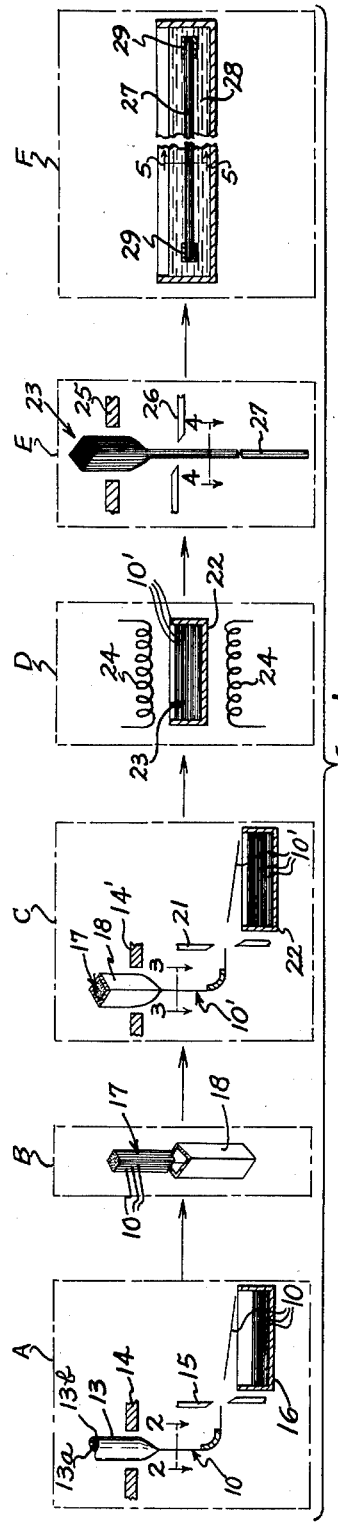
INVENTOR
JOHN W. HICKS, JR.
BY Louis L. Gagnon
ATTORNEY United States Patent Office 3,004,368
Patented Oct. 17, 1961

3,004,368
MANUFACTURE OF FIBER OPTICAL DEVICES
John W. Hicks, Jr., Fiskdale, Mass., assignor to American Optical Company, Southbridge, Mass., a voluntary association of Massachusetts
Filed June 10, 1958, Ser. No. 741,183
9 Claims. (Cl. 49—79)

This invention relates to fiber optical devices and has particular reference to the provision of a novel fiber optical device and method of making the same.

Fiber optical devices which are formed of a great number of relatively small elongated light-conducting filaments or fibers in tightly packed side-by-side bundled relation with each other have become extremely useful as image-transferring means whereby optical images produced at one end of such a device may be transferred over a considerable distance by the principle of internal reflection and accurately received at the opposite end of the device. Such devices have become generally known as "Fiberscopes" and are oftentimes constructed so as to be flexible between their end parts by connecting the individual fibers together only at their opposite ends whereby each of the fibers of the device will be free to flex independently of their respective adjacent fibers. This provides the composite assembly with a readily flexible midsection.

In order to obtain an accurate reproduction of an image which is transferred by a device of the above character, it is essential that the individual light-conducting fibers be arranged in identical geometrical patterns at the opposite ends of the device so that each part of an image at the object end of the device will be reproduced at the image end thereof in its true location. Since diagnostic instruments, such as gastroscopes or the like, must be capable of transferring images with a relatively high degree of resolution, it is also necessary to form the devices with fibers which are extremely small in cross-sectional area. It is a well known fact that smaller fibers in greater numbers per unit of cross-sectional area will provide the higher degrees of resolution. It should be noted, however, that the cross-sectional size of the fibers should not be so small as to approach the wavelength of light.

Heretofore, the task of fabricating fiberscopes, particularly of the flexible type which are formed of extremely small light-conducting fibers, has been relatively difficult, tedious and time-consuming, with the result that such devices have become expensive to manufacture and economically prohibitive for widespread use.

It, therefore, is a primary object of the present invention to provide an improved device of this nature and novel method of making the same for overcoming the difficulties encountered heretofore in the manufacture of such devices, and to further provide an improved technique by which such fiber optical devices may be simply, accurately and economically manufactured.

Another object is to provide a novel method for accurately forming a bundle of light-conducting fibers having substantially identical geometrically patterned rigid end parts and flexible midsections.

Another object is to provide an improved technique by which an initially rigidly formed bundle of light-conducting fibers may be rendered flexible throughout a predetermined section of its length without destroying the optical properties of the bundle.

Another object is to provide an improved method for fabricating a fiberscope of the flexible type wherein an assembly of light-conducting fibers is finally drawn to a desired cross-sectional size in accordance with the final size desired of the fiberscope and the fibers are thereafter detached from each other throughout a desired section of the assembly to render said assembly flexible between its end parts.

Another object is to provide a novel method for forming flexible fiberscopes which embodies assembling a multiplicity of light-conducting fibers in bundled parallel side-by-side relation with each other, forming a bond between said fibers with a removable material and removing said material from between said fibers throughout certain areas of the bundle.

Other objects and advantages of the invention will become apparent from the following description when taken in conjunction with the accompanying drawings in which:

FIG. 1 is a diagrammatic illustration, in block form, of means for carrying out the process of the invention wherein the various basic steps in the method are illustrated within the individual blocks or outlined areas;

FIG. 2 is a greatly enlarged cross-sectional view taken on line 2—2 of FIG. 1 and illustrating a single fiber at one stage of the present method of manufacture;

FIG. 3 is a greatly enlarged cross-sectional view taken on line 3—3 of FIG. 1 and illustrating the relation of the fibers and associated parts at another stage of manufacture;

FIG. 4 is another greatly enlarged cross-sectional view taken on line 4—4 of FIG. 1 and illustrating the relation of the fibers at another stage of manufacture;

FIG. 5 is a greatly enlarged cross-sectional view of the device of the invention taken on line 5—5 of FIG. 1 and illustrating the cross-sectional structure of fibers at the conclusion of the final step of the process illustrated by FIG. 1; and FIG. 6 is a side elevational view partially in section of a fiber optical instrument which incorporates the use of a device formed in accordance with the invention.

Referring more particularly to the drawings wherein like characters of reference designate like parts throughout the various views, there is illustrated in FIG. 1 a block diagram of the various basic steps in the process of the invention and within each of the dot-dash outlines or blocks, which are consecutively lettered A through F, there is diagrammatically illustrated means for performing the respective steps of the process.

The first step A in the manufacture of a fiber optical device of the character of the invention is to form a multiplicity of light-conducting fibers 10 each having a light-conducting core 11 and a light-insulating cladding 12 in surrounding relation with the core 11 (see FIG. 2). The core 11 is preferably formed of a high index flint glass or the like and the cladding 12 is preferably formed of a low index crown glass or the like and it will become apparent as the description progresses that the cladding 12 will function to maintain each of the cores 11 of the fibers 10 in spaced relation with each other when the fibers 10 are subsequently bundled together to form the device of the invention. By so light insulating the cores 11 of the fibers 10 from each other, light traveling through a particular one of said cores by the well known principle of internal reflection, will be substantially completely contained within said core. Thus, optical interaction between the individual light-conducting fibers of a bundle formed of said fibers will be substantially eliminated.

The fibers 10 may be formed by various known techniques, one of which is illustrated within the outline A of FIG. 1 wherein a glass rod 13 having a core part 13a of high index glass and an outer relatively thin sheath of low index glass 13b is extended through a ring-like heating element 14. The rod 13 is heated to a suitable drawing temperature by the heating element 14, which temperature is controlled in accordance with the softening characteristics of the glasses 13a and 13b, and the fiber 10 is drawn from the depending end of the rod 13. Thereafter, the drawn fiber is cut to predetermined lengths by suitable shearing means or the like 15 and collected in a container 16.

In the second step of the process of the invention which is illustrated within the outline B, the cut fibers 10 are gathered together and aligned in relatively accurate side-by-side parallel relation with each other to form a bundle 17 which is placed within a relatively thin walled glass tube 18. The walls of the tube 18 should be somewhat thinner than the thickness of each of the fibers 10, provided this does not render the tube 18 too fragile for practical use. In any event, the tube 18 should be as thin as is practically possible. The alignment of the fibers 10 may be accomplished in the manner disclosed in Patent No. 2,992,956 issued to Wilfred P. Bazinet, Jr. and the loading of the glass tube 18 with the bundle 17 of fibers may be accomplished by inserting the aligned fibers as a compact group into the tube 18 as illustrated in FIG. 1 within the outline B.

The glass tube 18 is formed of a high borax content glass commonly known as borosilicate glass.

Following the assembly of the bundle 17 of fibers with the tube 18, said assembly is drawn in the manner illustrated within the outline C, FIG. 1, to form a composite integral light-conducting fiber 10' which in itself consists of a multiplicity of individual light-conducting elements 19 enclosed within an outer casing of borosilicate glass 20 (see FIG. 3). The elements 19, of course, result from the drawing of the fibers 10 and the casing 20 results from the simultaneous drawing of the tube 18 as they are fused together by lowering them at a controlled rate through the heating unit 14'.

The drawn composite fiber 10' is cut to predetermined lengths by shearing means or the like 21 and the lengths are stacked in a container 22 in aligned parallel side-by-side relation with each other. The alignment of the composite fibers 10' in the container 22 is preferably accomplished by a vibration technique such as shown and described in an application Serial No. 715,406, filed February 14, 1958, in the name of Wilfred P. Bazinet, Jr., or by any other known technique. The composite fibers 10' are next lightly fused together to form a composite integral bundle 23 by subjecting the assembly thereof to temperatures controlled in a known manner in accordance with the characteristics of the glass of the casing 20. The above fusing operation is illustrated within the outline D of FIG. 1 wherein heating means 24 is diagrammatically illustrated.

Upon completion of the fusing operation, the resulting bundle 23 of fused together fibers 10' each having a borosilicate glass casing 20 thereon is removed from the container 22 and supported so as to extend through a ring-like heating element 25 in the manner illustrated within the outline E. With proper control of the temperature produced by the heating element 25, the bundle 23 is drawn to a reduced cross-sectional size 27 which is controlled to be of the cross-sectional size desired of the finally formed fiber optical device of the invention and is also drawn to a length approximately equal to the length desired of the fiber optical device so that when cut by shearing means or the like 26, the detached part 27 will be substantially of the size and shape of the fiber optical device to be formed therefrom.

In FIG. 4, there is shown a greatly enlarged fragmentary cross-sectional view of the part 27 wherein a multiplicity of the composite fibers 10' are bound together by the interfacial fusion of their respective surround casings 20 of borosilicate glass. It is pointed out that in each instance where a drawing operation is shown and described herein, the various parts of the resultant fibers are fused together to form a composite integral structure since the melting points of the various glasses are initially controlled so that the temperatures required to draw the fibers are, in all cases, sufficient to cause an interfacial fusion of the composite parts of the structure being drawn. Therefore, the individual light-conducting elements 19 of each of the fibers 10' are likewise bonded or fused to each other as well as to their respective borosilicate glass casings 20. Thus, the part 27 is rigid throughout its entire length.

In order to form a flexible fiberscope or the like from the part 27, the borosilicate glass casings 20 are leached or otherwise removed from the composite fibers 10' throughout the midsection of the part 27. Since the opposite ends of the fibers in a fiberscope must be maintained in accurately aligned relation with each other so as to provide the fiberscope with identically geometrically patterned end parts for the reasons given hereinabove, the borosilicate glass casings 20 which surround each of the composite fibers 10' are not removed from the opposite end portions of the part 27.

Removal of the borosilicate glass casings 20 from the composite fibers 10' throughout the midsection of the part 27 is accomplished by immersing the part 27 in hydrochloric acid 28 as illustrated within the outline F of FIG. 1 whereupon the hydrochloric acid will attack and disintegrate the structure of the borosilicate glass casings 20 which surround each of the composite fibers 10'. In order to retain the opposite ends of the part 27 intact, a coating or layer of a material such as an epoxy resin or the like 29 which is impervious to attack by hydrochloric acid, is applied to said ends of the part 27 in overlying relation with the casings 20 prior to its immersion in the acid. In this manner, the hydrochloric acid is prevented from contacting the borosilicate glass casings 20 at the ends of the part 27.

By allowing the part 27 to remain in the hydrochloric acid 28 for an extended period of time which is determined in accordance with the cross-sectional area of the part 27, the hydrochloric acid acting as a solvent will dissolve the borax content of the glass casings 20 and thereby leave the silica matrix in disconnected or powdered form whereby the individual bundles of the composite fibers 10' will be separated from each other and free to flex independently of each other throughout the area between the ends of the part 27. It is pointed out that since crown glass is relatively impervious to attack by hydrochloric acid, no appreciable erosion or deterioration of the cladding 12 on the fibers, which comprises the light-conducting elements 19, will take place.

Due to the fact that borosilicate glass is only partially soluble in hydrochloric acid and hydrochloric acid will not readily attack or dissolve the silica content or matrix of the borosilicate glass casings 20, but will dissolve the borax content of the glass casings 20, it has been found that the resultant leaching of the borosilicate glass casings 20 can be greatly speeded up by removing the part 27 from the hydrochloric acid at intervals during the leaching process and washing away the powdered silica deposit which results from the action of the hydrochloric acid on the glass casings 20. The silica deposit may be removed by washing the bundle 27 with water (preferably distilled water which has no substantial silica content) or by applying steam to the part 27. The water or steam will remove the silica deposit, whereupon the bundle 27 may be again immersed in the hydrochloric acid to continue the leaching of the glass casings 20 without interference due to the resultant loose or powdered deposit of silica which tends to form a stoppage between the composite fibers 10' and hinder the flowing of the hydrochloric acid between said fibers. By alternately immersing the part 27 in the acid and washing the same with water or steam, a more rapid removal of the borosilicate glass casings 20 may be brought about due to the fact that when the part 27 is in the acid, the borax content of the glass casings 20 will be attacked and dissolved by the acid and when the bundle is thereafter washed with water, the remaining silica content of the glass casings will be removed. Nevertheless, it should be understood that the borosilicate glass casings 20 must first be subjected to attack by the acid to leach out the borax and to leave only the silica matrix of said glass casing structure, otherwise, the silica content could not thereafter be appreciably removed from the bundle by the use of steam or water.

When the removal of the borosilicate glass casings 20 from the composite fibers 10' has been completed, the part 27 is again washed with water or steam to remove any residue of acid and thus prevent unnecessary erosion of the claddings 12 which surround the individual light-conducting elements 19 of the composite fibers 10' and to permit the part 27 to be handled safely.

By removing the borosilicate glass from the composite fibers 10' the part 27 falls into loose composite strands between its ends each of which contain a multiplicity of light-conducting elements 19. Thus, a flexible fiber optical device results which, when optically finished at its ends, will function to accurately transfer an optical image from one end thereof to the other regardless of the extent of flexing which is introduced throughout its midsection. Due to the formation of the composite fibers 10' which each embody the multiplicity of elements 19, high image resolution can be obtained without using extremely small and fragile individually separated fibers.

It is desirable to provide a very thin casing of borosilicate glass 20 on each of the composite fibers 10' of a thickness preferably less than the thickness of the individual light-conducting elements 19 by control of the initial thickness of th etube 18 which becomes the casing 20 when the assembly of the bundle 17 of fibers and the tube 18 is drawn as stated above. In this manner, relatively little image-forming light at the object end of a device of the character of the invention will be lost by passing through the portions of the casings 20 which remain at said object end. However, in extreme cases where the thickness of the borosilicate glass casings 20 at said object end would be detrimental to resolution of images transferred by such fiber optical devices, prior to removing the borosilicate glass casings from between the ends of the part 27, the borosilicate glass casings may be leached from the opposite ends of the part 27. The elements 19 at said opposite ends of the part 27 can then be compacted by forcing the respective groups of elements 19 into side surface engaging relation with each other whereupon the groups of elements 19 at said ends can be fused or glued together. Following this operation, the remainder of the borosilicate glass casings 20 is removed from the mid-section of the part 27 in the manner disclosed hereinabove and an extremely compact flexible fiber optical device having exceptionally high image resolving power is formed.

It is pointed out that in the above-described process, any desired number of successive fiber drawing operations between the steps illustrated by A and B of FIG. 1 may be carried out to provide individual fibers 10 with multiple light-conducting elements which increase the image resolving power of the finally formed fiber optical device. That is, the fibers 10 which make up the bundle 17 may each embody a multiplicity of light-conducting elements rather than the single core 11 (FIG. 2) which has been described above. In such a case, each of the resultant light-conducting elements 19 of FIGS. 3, 4 and 5 would embody, in themselves, a multiplicity of individual light-conducting elements. It is again pointed out that the image resolving power of the finally formed device of the invention is dependent upon the number, size, compactness and accuracy of alignment of the individual light-conducting elements which together make up said device.

In FIG. 6 there is illustrated a flexible fiberscope which embodies the use of a flexible fiber optical device 30 formed in accordance with the above-described process.

The opposite ends of the device 30 which have been optically finished to render them receptive to the transmission of light are each mounted in the respective collars 31 and 32. A convergent eye lens and mount 33 is suitably supported on the enlarged end of the collar 31 and a conventional objective lens and mount 34 is adjustably positioned on the collar 32 by screw thread means or the like. Image-forming light passing through the objective lens will enter the adjacent end of the device 30 and be transferred thereby to the eye lens which, in turn, will image said light at a predetermined eye point.

An alternate method of forming a flexible bundle of accurately aligned light-conducting fibers without the use of the above-mentioned borosilicate glass is to form a multiplicity of fibers 10 in the manner illustrated at A in FIG. 1 and thereafter provide each of said fibers with a thin casing of a metallic substance which will characteristically wet the glass cladding 12 of the fibers and be softenable at a temperature equal to the temperature which is required to subsequently draw the glass fibers. Aluminum has been found to meet the above requirements and may be provided intially in the form of a tube similar to the borosilicate glass tube 18 which is illustrated at B in FIG. 1.

By replacing the tube 18 of FIG. 1 with an aluminum tube, the steps of the process illustrated by the blocked outlines B, C, D, E and F are carried out in the manner described hereinabove, with the exception that the hydrochloric acid 28 in step F would be replaced by a solution such as sodium hydroxide or the like which, acting as a solvent $a$, will attack and dissolve the aluminum casings from between the glass fibers of the device being formed.

A refinement of the above process involving the use of aluminum would be to perform the steps B, C, D and E in a reducing atmosphere so as to prevent oxidation of the aluminum and thereby render said aluminum more readily removable during the dissolving operation at F. Also, the removal of the aluminum at step F may be speeded up by vibrating the container in which the sodium hydroxide solution is placed.

It should be clearly understood that the method steps which are illustrated in FIG. 1 are given by way of example only and that various omissions or substitute steps may be incorporated to form a device embodying the characteristics of the invention. For example, an alternative method of forming a flexible fiber optical device of the above character would be to provide a metallic or borosilicate glass casing directly upon the fibers 10 which are preformed with the core 11 and cladding 12. This may be accomplished by initially providing a casing of aluminum or borosilicate glass around the rod 13 of FIG. 1 and drawing the rod 13 and casing simultaneously into a fiber 10 as illustrated whereupon the fiber 10 will have, in addition to its core 11 and cladding 12, an outer casing of the aluminum or borosilicate glass.

The fibers thus formed are next accurately assembled in side-by-side bundled relation with each other and are preferably fused to each other as shown at D or cemented or otherwise attached together to form a compact rigid bundle thereof. The bundle is then drawn to a reduced cross-sectional size in the manner illustrated at E in FIG. 1 wherein the steps at B and C are eliminated. This forms a relatively rigid composite fiber optical part similar to the part 27 of FIG. 1 which will become the fiber optical device of the invention when its mid-section is thereafter rendered flexible by removal of the aluminum or borosilicate glass casings from around the intermediate section of the length of said fibers by the technique illustrated at F of FIG. 1. If the coatings are formed of borosilicate glass, hydrochloric acid will be used as a leaching solution to dissolve the borax content of the glass. However, if the coatings are formed of aluminum, sodium hydroxide will be used to dissolve the aluminum.

It should be understood that metals or glasses other than aluminum or borosilicate glass may be used as removable casings on the light-conducting fibers to carry out the process of the invention. However, the materials which are used as removable casings must be characteristically similar to the aluminum or borosilicate glass so as to have a tendency to wet the glass or material of the light-conducting fibers and be softenable at temperatures approximately equal to the temperatures required for drawing the light-conducting fibers.

It is also pointed out that any desired number of fiber drawing, assembling and re-drawing steps may be performed prior to the step of applying of the removable borosilicate glass or aluminum casings to the fibers so as to provide fibers having any desired number or size of light-conducting cells or elements. The removable glass or metallic casings are applied to the fibers, in all instances, prior to the final drawing step of the process of the invention.

While it has been stated above that in instances when borosilicate glass or the like is used, in order to prevent stray light from passing through said glass at the ends of the bundles of fibers, the borosilicate glass may be initially removed from said ends with the ends thereafter being drawn together and secured in intimate side-by-side relation with each other. It might, in some uses of said device, be desirable to permit transmission of light through said borosilicate glass, such, for example, as controlled visible, and invisible rays in combination with the transmission of the image-forming light which is transmitted through the fibers per se, and the present invention is intended to cover such devices and method of making the same.

Further, the metallic casings may also be utilized to transmit electrical energy or heat by conduction in addition to the transmission of the image-forming light through the fibers and a device of this nature and method of making the same is also a part of this invention.

From the foregoing, it can be seen that simple, efficient and economical means and method have been provided for accomplishing all of the objects and advantages of the invention as expressed in the accompanying claims and the invention is not limited to the exact matters shown and described as only the preferred matters have been given by way of illustration.

Having described my invention, I claim:

1. The method of forming a flexible fiber optical device from a multiplicity of flexible light-conducting fibers formed of core glass having a relatively high index of refraction with a thin layer of relatively low index glass therearound, comprising, forming bundles of said fibers, enveloping each of said bundles of fibers with a tubular casing of at least partially soluble metallic material, assembling said encased bundles of fibers together in intimate side-by-side relation with each other, heating and drawing said assembly of encased bundles of fibers to heat join the same and to form an elongated integral part therefrom of a predetermined cross-sectional size and length in accordance with the dimensions desired of said device, subjecting the mid-section of said part to a solvent for dissolving at least a substantial portion of said metallic material from between said encased bundles of fibers while protecting the opposite ends of said part from exposure to said solvent to cause said fibers to become detached from each other throughout said mid-section only.

2. The method of forming a flexible fiber optical device comprising providing a rod of optical medium having a core part formed of material having a relatively high index of refraction and a relatively thin surrounding coating of material having a relatively low index of refraction, heating and continuously drawing said rod to form a first flexible fiber therefrom, cutting said first fiber into predetermined lengths, assembling said lengths of first fibers in side-by-side bundled relation with each other, placing said bundle within an intimately fitting tubular casing of material which is at least partially soluble, heating and drawing said bundle and casing together as a unit to form a second flexible fiber therefrom, cutting said second fiber into predetermined lengths, assembling said lengths of said second fiber in side-by-side bundled relation with each other, heating and drawing said bundle of second fibers to form an elongated part therefrom of reduced cross-sectional area, cutting said part from said bundle of second fibers and subjecting a predetermined section of said part to a solvent adapted to dissolve at least a substantial amount of said material from said section to cause the resultant fibers throughout said section of said part which were initially surrounded by said material to become separated from each other and free to flex independently of each other.

3. The method of forming a flexible fiber optical device from a multiplicity of flexible light-conducting elements each having at least one light-conducting part embodying a core formed of transparent material of relatively high index of refraction and a relatively thin cladding of material of relatively low index of refraction around said core, comprising, enveloping each of said elements with a casing of material which is at least partially soluble, assembling said elements having the casing thereon in side-by-side relation with each other, heating and drawing said assembly of elements to form an elongated part therefrom of reduced cross-sectional size and subjecting a predetermined portion of said part to a solvent for dissolving at least a substantial amount of said casing material to cause said elements to become detached from each other throughout said portion.

4. The method of forming a flexible fiber optical device from a multiplicity of flexible light-conducing elements each having at least one light-conducting part embodying a core formed of transparent material of relatively high index of refraction and a relatively thin cladding of material of relatively low index of refraction around said core comprising, enveloping each of said elements with a casing of metallic material which is at least partially soluble, assembling said elements having the casing thereon in side-by-side relation with each other, heating and drawing said assembly of elements to form an elongated part therefrom of reduced cross-sectional size and subjecting a predetermined portion of said part to a solvent for dissolving at least a substantial amount of said casing material to cause said elements to become detached from each other throughout said portion.

5. The method of forming a flexible fiber optical device from a multiplicity of flexible light-conducting elements each having at least one light-conducting part embodying a core formed of transparent material of relatively high index of refraction and a relatively thin cladding of material of relatively low index of refraction around said core comprising, enveloping each of said elements with a casing of glass which is at least partially soluble, assembling said elements having the casing thereon in side-by-side relation with each other, heating and drawing said assembly of elements to form an elongated part therefrom of reduced cross-sectional size and subjecting a predetermined portion of said part to a solvent for dissolving at least a substantial amount of said casing material to cause said elements to become detached from each other throughout said portion.

6. The method of forming a flexible fiber optical device from a multiplicity of flexible light-conducting fibers each having a light-conducting core part of transparent material of relatively high index of refraction with a relatively thin surrounding cladding of material of relatively low index of refraction therearound comprising bundling said fibers together in side-by-side relation with each other, placing said bundle of fibers within a tubular casing of material which is at least partially soluble, heating and drawing said encased structure of bundled-together fibers to a reduced cross-sectional size to form an elongated fiber-like member therefrom having the material of said casing thereon, cutting said member into elements of preselected lengths, assembling a plurality of said elements together in side-by-side relation with each other, heating and drawing said assembly to form an elongated part therefrom of reduced cross-sectional size and subjecting a predetermined portion of said part to a solvent for dissolving at least a substantial amount of said casing material on said elements to cause said elements to become detached from each other throughout said portion of said elongated part.

7. The method of forming a flexible fiber optical device from a multiplicity of flexible light-conducting elements each having at least one light-conducting part embodying a core formed of transparent material of relatively high index of refraction and a relatively thin cladding of material of relatively low index of refraction around said core comprising enveloping each of said elements with a casing of material which is at least partially soluble, assembling said elements having the casing thereon in side-by-side relation with each other, heating and drawing said assembly of elements to form an elongated part therefrom of reduced cross-sectional size, covering a portion of said part adjacent its opposite ends with means impervious to attack by solvents for said casing material and subjecting the uncovered portion of said part to a solvent for dissolving an amount of said casing material sufficient to cause said elements to become detached from each other throughout said uncovered portion.

8. The method of forming a flexible fiber optical device from a multiplicity of flexible light-conducting fibers each having a light-conducting core part of transparent material of relatively high index of refraction with a relatively thin surrounding cladding of material of relatively low index of refraction therearound comprising bundling said fibers together in side-by-side relation with each other, placing said bundle of fibers within a tubualr glass casing which is at least partially soluble, heating and drawing said structure of bundled-together fibers and casing to a reduced cross-sectional size to form an elongated fiber-like member therefrom having said glass casing thereon, cutting said member into elements of preselected lengths, assembling a plurality of said elements together in side-by-side relation with each other, heating and drawing said assembly of elements to form an elongated part therefrom of reduced cross-sectional size and subjecting a predetermined portion of said part to a solvent for dissolving an amount of said glass casings sufficient to cause said elements to become detached from each other throughout said portion of said elongated part.

9. The method of forming a flexible fiber optical device from a multiplicity of flexible light-conducting elements each having at least one light-conducting part embodying a core formed of transparent material of relatively high index of refraction and a relatively thin cladding of material of relatively low index of refraction around said core, comprising enveloping each of said elements with a casing of material which is at least partially soluble, assembling said elements having the casing thereon in side-by-side relation with each other, heating and drawing said assembly of elements to form an elongated part therefrom of reduced cross-sectional size, subjecting the opposite end portions of said part to a solvent for dissolving at least a substantial amount of said casing material to cause said elements to become detached from each other throughout said portions, urging said elements into side surface engaging relation with each other where detached at said opposite end portions, connecting said elements together at said opposite end portions and thereafter subjecting the intermediate portion of said part to said solvent to cause said elements to become detached from each other throughout said intermediate portion.

References Cited in the file of this patent

UNITED STATES PATENTS

| | | |
|---|---|---|
| 1,273,346 | Fagan | July 23, 1918 |
| 2,252,989 | Pollack | Aug. 19, 1941 |
| 2,311,704 | Simison | Feb. 23, 1943 |
| 2,313,296 | Lamesch | Mar. 9, 1943 |
| 2,354,591 | Goldsmith | July 25, 1944 |
| 2,461,841 | Nordberg | Feb. 15, 1949 |
| 2,484,003 | Simison | Oct. 4, 1949 |
| 2,608,722 | Steutzer | Sept. 2, 1952 |
| 2,635,390 | Parker | Apr. 21, 1953 |
| 2,652,660 | Kurz | Sept. 22, 1953 |
| 2,694,661 | Meyer | Nov. 16, 1954 |
| 2,752,731 | Altosaar | July 3, 1956 |
| 2,825,260 | O'Brien | Mar. 4, 1958 |
| 2,877,368 | Sheldon | Mar. 10, 1959 |
| 2,915,806 | Grand | Dec. 8, 1959 |